(12) United States Patent  (10) Patent No.: US 8,475,017 B2
Salter et al.  (45) Date of Patent: Jul. 2, 2013

(54) HIDDEN LAMP MANUFACTURE PROCESS

(75) Inventors: Stuart C. Salter, White Lake, MI (US);
Chi Li, Farmington Hills, MI (US);
Denis Patrick Igoe, Livonia, MI (US);
Jeffrey Singer, Canton, MI (US);
Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 896 days.

(21) Appl. No.: 12/577,294

(22) Filed: Oct. 12, 2009

(65) Prior Publication Data

US 2010/0212819 A1  Aug. 26, 2010

Related U.S. Application Data

(63) Continuation-in-part of application No. 12/390,495, filed on Feb. 22, 2009, now Pat. No. 8,162,519.

(51) Int. Cl.
*B60Q 3/02* (2006.01)

(52) U.S. Cl.
USPC ............................ 362/490; 362/488; 362/471

(58) Field of Classification Search
USPC ................ 362/147, 364, 365, 471, 488, 489, 362/490, 493; 29/426.2, 897.2; 156/221
See application file for complete search history.

(56) References Cited

U.S. PATENT DOCUMENTS

| 4,794,373 | A | * | 12/1988 | Harrison | 362/471 |
|---|---|---|---|---|---|
| 4,923,542 | A | | 5/1990 | Janicki et al. | |
| 5,411,688 | A | | 5/1995 | Morrison et al. | |
| 5,508,509 | A | | 4/1996 | Yafuso et al. | |
| 5,699,438 | A | | 12/1997 | Smith et al. | |
| 5,754,664 | A | | 5/1998 | Clark et al. | |
| 5,758,947 | A | * | 6/1998 | Glatt | 362/105 |
| 5,824,251 | A | | 10/1998 | Morrison et al. | |
| 6,464,381 | B2 | | 10/2002 | Anderson, Jr. et al. | |
| 6,555,042 | B1 | | 4/2003 | Mola et al. | |
| 6,623,069 | B2 | | 9/2003 | Grimm | |
| 6,652,128 | B2 | | 11/2003 | Misaras | |
| 6,773,129 | B2 | | 8/2004 | Anderson, Jr. et al. | |
| 6,959,956 | B1 | | 11/2005 | Fero et al. | |
| 7,234,850 | B2 | | 6/2007 | Garcia et al. | |
| 2001/0012369 | A1 | | 8/2001 | Marquiss | |
| 2006/0208378 | A1 | | 9/2006 | Khambete et al. | |
| 2011/0157906 | A1 | * | 6/2011 | Oeuvrard et al. | 362/488 |

* cited by examiner

*Primary Examiner* — Y My Quach Lee
(74) *Attorney, Agent, or Firm* — Vichit Chea; Price Heneveld LLP

(57) ABSTRACT

A method for making a vehicle interior panel including positioning a slipsheet on a film or fabric liner. The liner is placed on a substrate board. The liner and substrate board are formed into an interior panel. A cavity is formed by removing a portion of the substrate board from the interior panel adjacent to the slipsheet position. A lamp is positioned in the cavity.

20 Claims, 6 Drawing Sheets

HIDDEN LAMP MANUFACTURE PROCESS

CROSS-REFERENCE TO RELATED APPLICATION

This application is a continuation-in-part of U.S. patent application Ser. No. 12/390,495, entitled "CONCEALED INTERIOR LIGHTING FOR AUTOMOBILES," filed on Feb. 22, 2009 now U.S. Pat. No. 8,162,519, the disclosure of which is hereby incorporated herein by reference in its entirety.

FIELD OF THE INVENTION

The present invention generally relates to a hidden lamp manufacture process.

BACKGROUND OF THE PRESENT INVENTION

Lamps are generally disposed about a vehicle interior to provide light inside the automobile.

SUMMARY OF THE PRESENT INVENTION

One aspect of the present invention includes a method for making a vehicle interior panel including positioning a slipsheet on a liner. The liner is placed on a substrate board. The liner and substrate board are formed into an interior panel. A cavity is formed by removing a portion of the substrate board from the interior panel adjacent to the slipsheet position. A lamp is positioned in the cavity.

Another aspect of the present invention includes a method for making a vehicle interior panel including forming an interior panel with a liner, a substrate, and a removable slipsheet disposed therebetween. A portion of the substrate board adjacent to the slipsheet is removed to form a cavity. A lamp is positioned in the cavity. A visual indicator is displayed on an interior side of the interior panel that denotes the position of the lamp behind the liner.

Yet another aspect of the present invention includes a method of positioning a vehicle lamp including forming an interior panel from a liner and a substrate board. A cavity is formed in the interior panel by removing a portion of the substrate board from the liner. A lamp is positioned in the cavity. A visual indicator is displayed on an interior side of the interior panel that denotes the position of the lamp behind the liner.

These and other aspects, objects, and features of the present invention will be understood and appreciated by those skilled in the art upon studying the following specification, claims, and appended drawings.

BRIEF DESCRIPTION OF THE DRAWINGS

FIG. 11 is a bottom perspective view with the hidden lamp on.

DETAILED DESCRIPTION OF THE PREFERRED EMBODIMENTS

Figure 1:
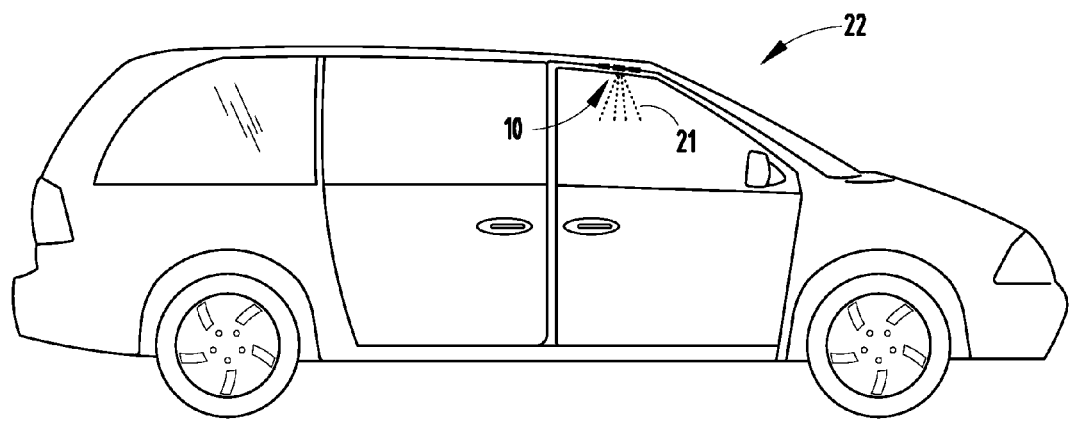
FIG. 1 is a side elevational view of a vehicle incorporating one embodiment of a hidden lamp of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
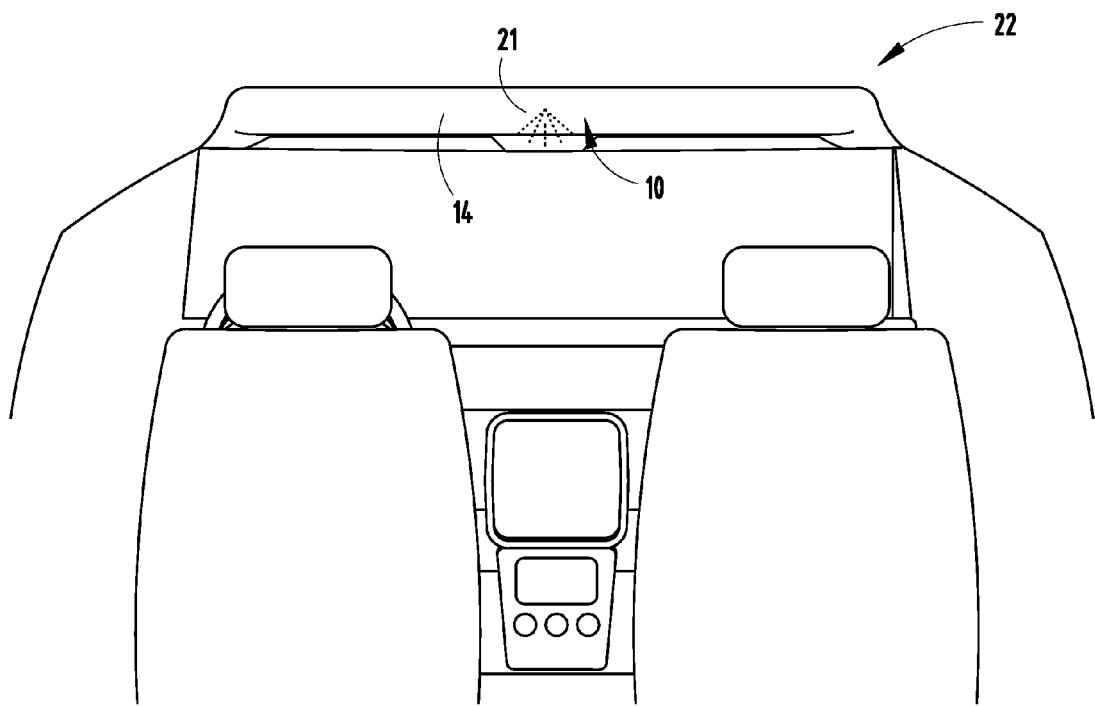
FIG. 2 is a rear perspective view of an interior portion of the vehicle of FIG. 1.
Figure 7:
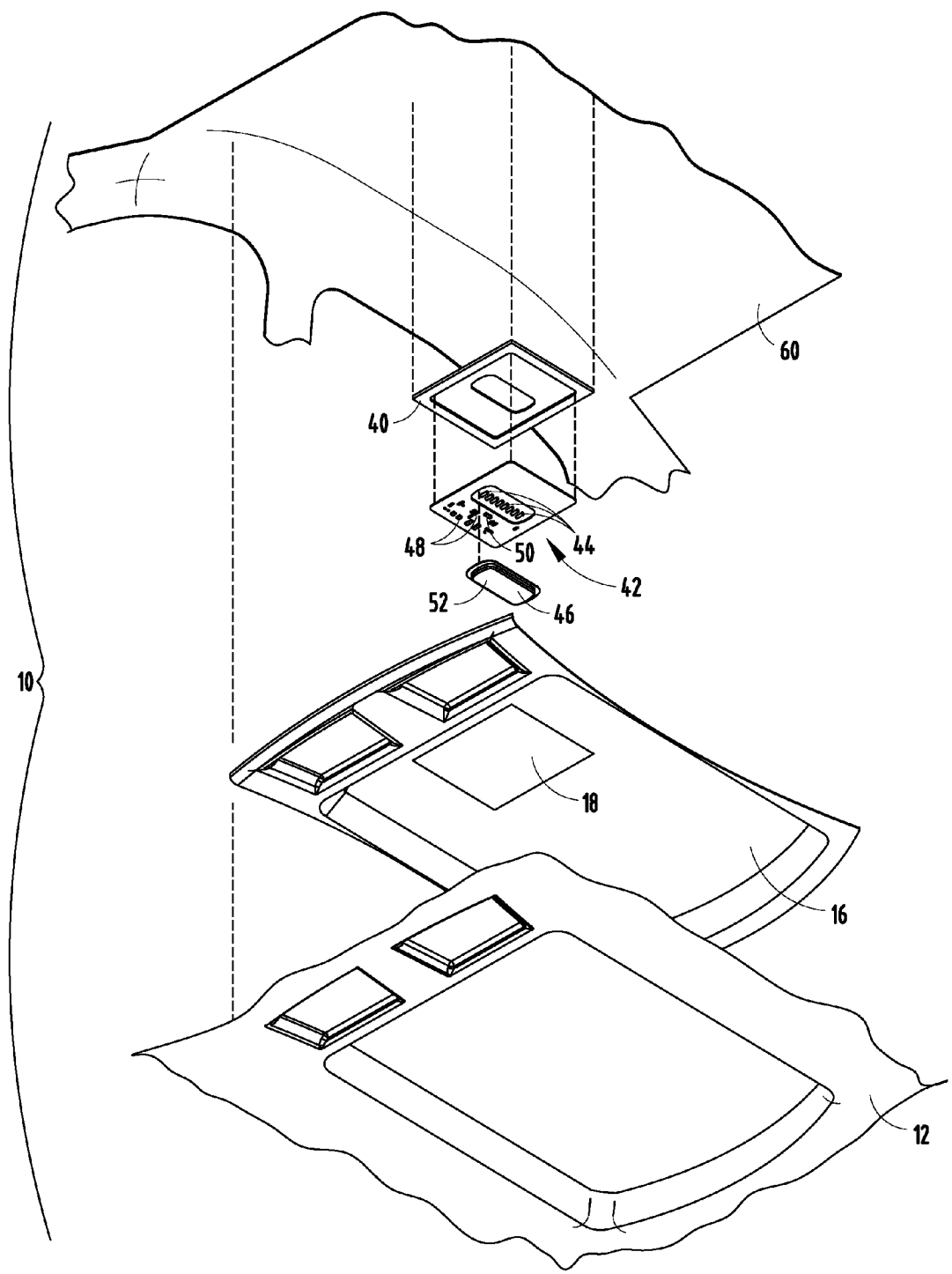
FIG. 7 is a bottom perspective exploded view of one embodiment of an interior panel prior to installation of a hidden lamp.

Referring to FIGS. 1, 2, and 7, the reference numeral 10 generally designates a vehicle interior panel 10 including a slipsheet 12 and a film or fabric liner 14. The liner 14 is placed on a substrate board 16. The liner 14 and substrate board 16 are formed into the vehicle interior panel 10. A cavity 18 is formed by removing a portion of the substrate board 16 from the vehicle interior panel 10 adjacent to the slipsheet 12. A lamp 20 (FIG. 8) is positioned in the cavity 18.

Referring again to FIGS. 1 and 2, the vehicle interior panel 10 of the present invention includes the hidden lamp 20. The lamp 20 is hidden, and therefore, does not protrude through the liner 14 of the vehicle interior panel 10, thereby creating an aesthetic and seamless viewing surface. It is conceived that the interior panel could be a headliner, door trim, or any of a variety of other panels. The liner 14 may be constructed of any of a variety of materials, including a film or fabric. Because the lamp 20 is hidden, it may not be readily observable from the interior portion of a vehicle 22 when not in use. Accordingly, an indicator 21 may be used to show a vehicle passenger where the lamp 20 is positioned, so that the driver or passenger may activate or deactivate the lamp 20 as desired.

Figure 3:
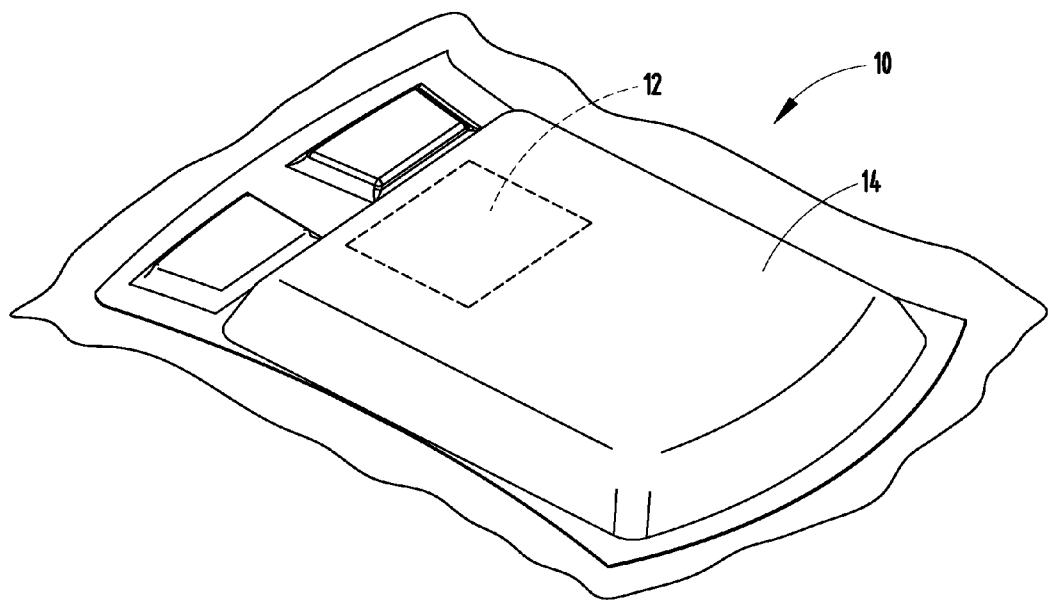
FIG. 3 is a bottom perspective view of a vehicle interior panel.
Figure 4:
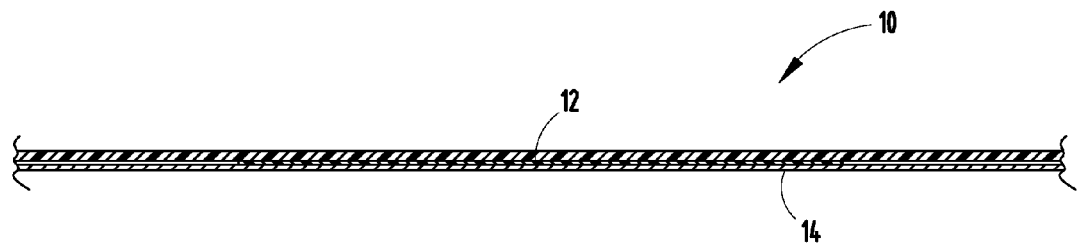
FIG. 4 is a side cross-sectional view of one embodiment of a vehicle interior panel.

Referring now to FIGS. 3 and 4, the process for making the vehicle interior panel 10 includes adhering the liner 14 to the substrate board 16. The slipsheet 12 is positioned between the liner 14 and the substrate board 16 at a predetermined lamp installation site 24 where the hidden lamp 20 will ultimately be positioned. The slipsheet 12 is constructed from a material that will not adhere or connect with the liner 14. Accordingly, the slipsheet 12 prevents the liner 14 from adhering to the substrate board 16 at the lamp installation site 24. After the substrate board 16, slipsheet 12, and liner 14 have been molded to conform with the interior portion of the predetermined vehicle 22, a portion 30 of the substrate board 16 adjacent to the slipsheet 12 is removed by a knife, router, water jet, or other device known for cutting the vehicle interior panel 10. The portion 30 of the substrate board 16 is removed, but the liner 14 remains, which forms the cavity 18. This cavity 18 provides a location for the hidden lamp 20. Although the slipsheet 12 is illustrated during construction of a headliner, it is contemplated that this method of assembly can be used in any interior panel 10 in the vehicle 22.

Figure 5:
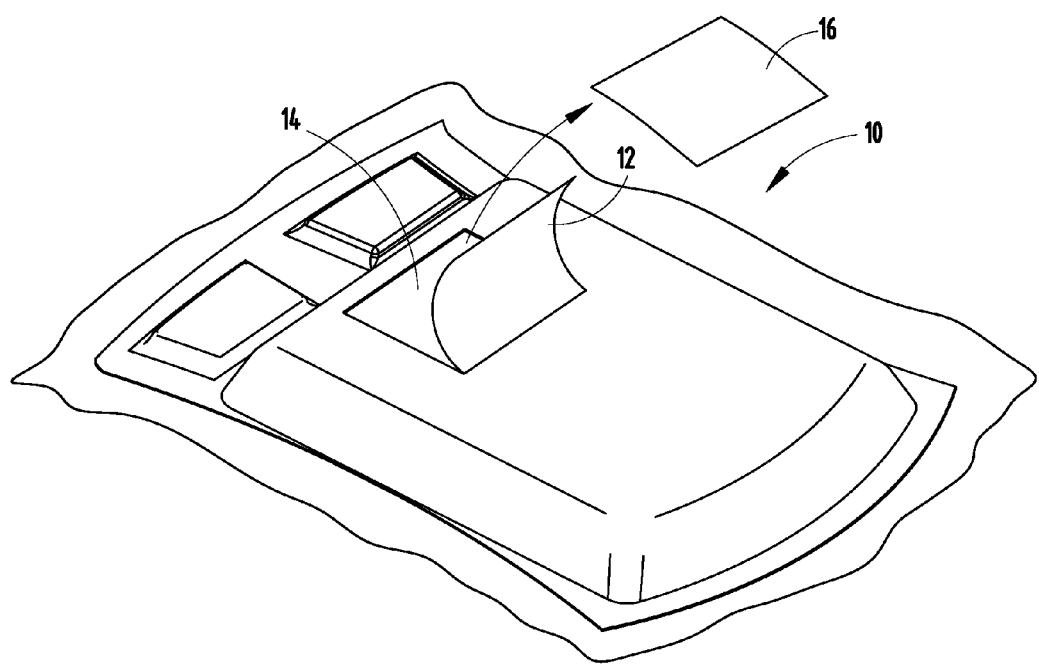
FIG. 5 is a bottom perspective view of the vehicle interior panel of FIG. 3 during removal of a slipsheet.
Figure 6:
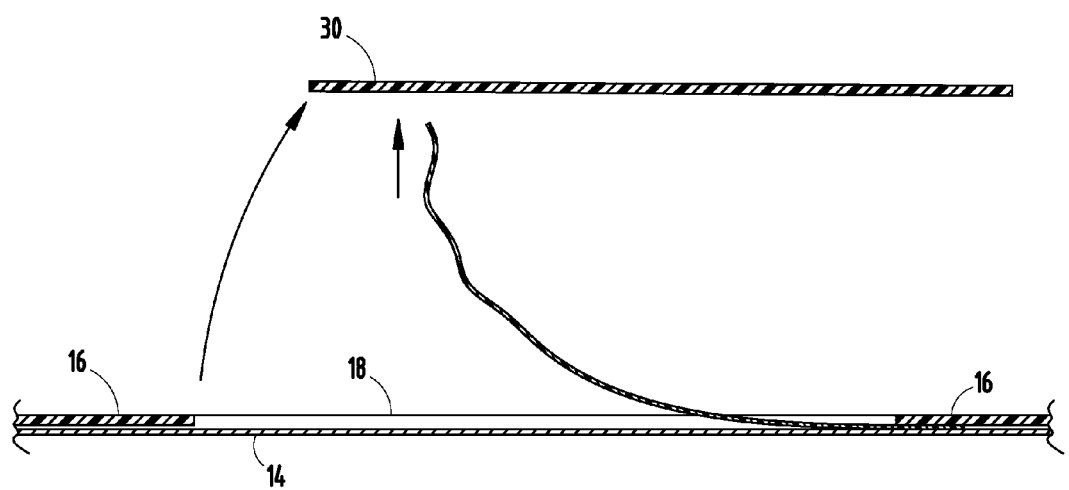
FIG. 6 is a side cross-sectional view of the vehicle interior panel during removal of the slipsheet.

Referring now to FIGS. 5-7, after the substrate board 16 and slipsheet 12 have been removed, the lamp 20 is inserted. The lamp 20 includes a frame 40 that secures the lamp 20 and protects the lamp 20 during installation. The frame 40 may be constructed of any of a variety of materials, including wood, plastic, or metal. A circuit board 41 and a light source 42 are secured inside the frame 40. The light source 42 includes a plurality of light emitting diodes (LEDs) 44 and a diffuser 46. It is conceived that the diffuser 46 may be disposed inside a lens and that more than one diffuser 46 may be present. The diffuser 46 may be clear or opaque and is designed to help disperse light emitted from the LEDs 44.

Referring to the embodiment illustrated in FIGS. 5-7, the indicator 21 may be provided in a variety of ways. For example, a single locator LED 50 may be positioned near the LEDs 44 and activated when the LEDs 44 are deactivated. Alternatively, the locator LED 50 may remain activated even when the LEDs 44 are activated. Regardless, when the LEDs 44 are deactivated, the locator LED 50 is activated. As a result of the locator LED 50 being activated, the position of the hidden lamp 20 is made readily discernable from inside the vehicle 22 by the driver and passengers.

In another embodiment, instead of using the locator LED 50, the diffuser 46 may have a substantially concave, convex, or slightly extended surface 52, that shows as a slight malformity in the vehicle interior panel 10. In yet another embodiment, a symbol is printed directly onto the vehicle interior panel 10, the symbol serving as a locator for the hidden lamp 20 position. Alternatively, the liner 14 may be dyed or bleached to indicate the position of the hidden lamp 20. Yet another alternative includes providing a separate textured liner 14 that provides a tactile indicator of where the hidden lamp 20 is positioned.

Figure 8:
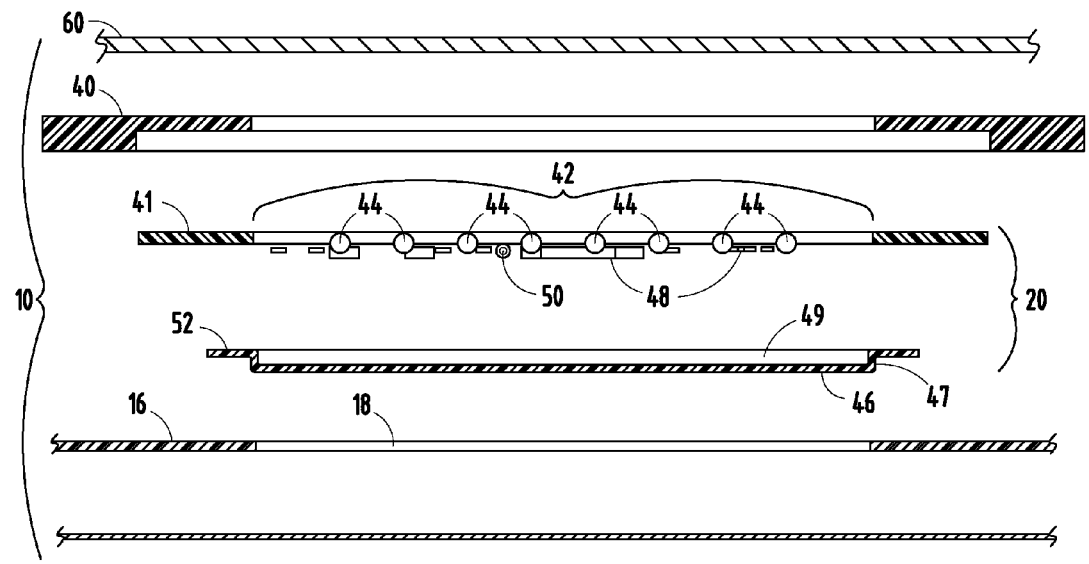
FIG. 8 is a side cross-sectional exploded view of one embodiment of a vehicle interior panel of the present invention.
Figure 8A:
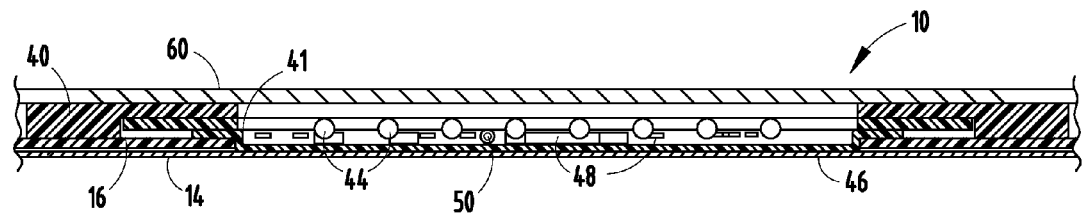
FIG. 8A is a side cross-sectional view of the vehicle interior panel of FIG. 8.
Figure 9:
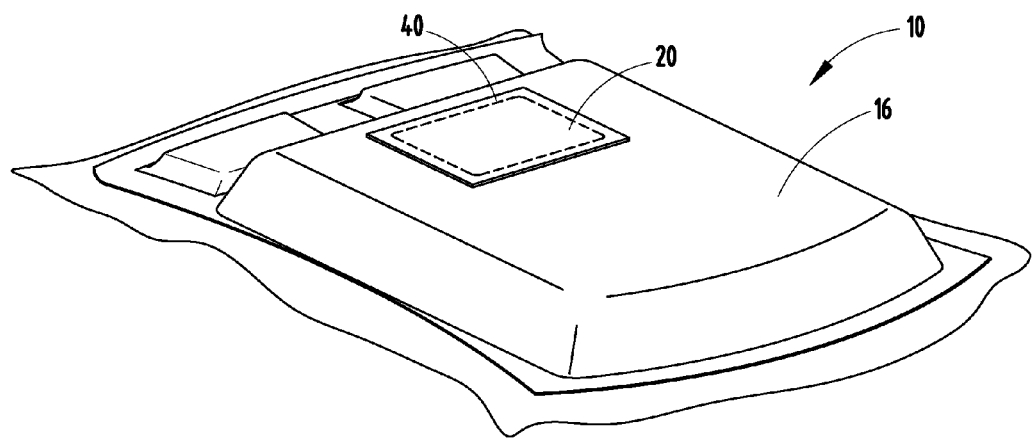
FIG. 9 is a bottom perspective view of a vehicle interior panel after installation of a hidden lamp.

Referring now to FIGS. 8-9, a cross-section of the vehicle interior panel 10, as installed in a roof 60 of the vehicle 22, is shown. The roof 60 is the uppermost member and is generally constructed of a strong material, such as metal, to protect the interior of the vehicle 22 as well as vehicle 22 occupants. The plastic frame 40 is disposed below the roof 60, and includes the cavity 18 adapted to receive the hidden lamp 20 during installation. The diffuser 46 and circuit board 41 are connected by mechanical fasteners or adhesion. The diffuser 46 includes an offset 47 with a recess 49 that allows ample room for the LEDs 44. The cavity 18 and the substrate board 16 are designed to receive the offset 47, allowing for a flush fit between the substrate board 16 and the offset 47 of the diffuser 46. As a result, the liner 14 extends evenly over the substrate board 16 and diffuser 46 of the hidden lamp 20 (FIG. 8A).

Figure 10:
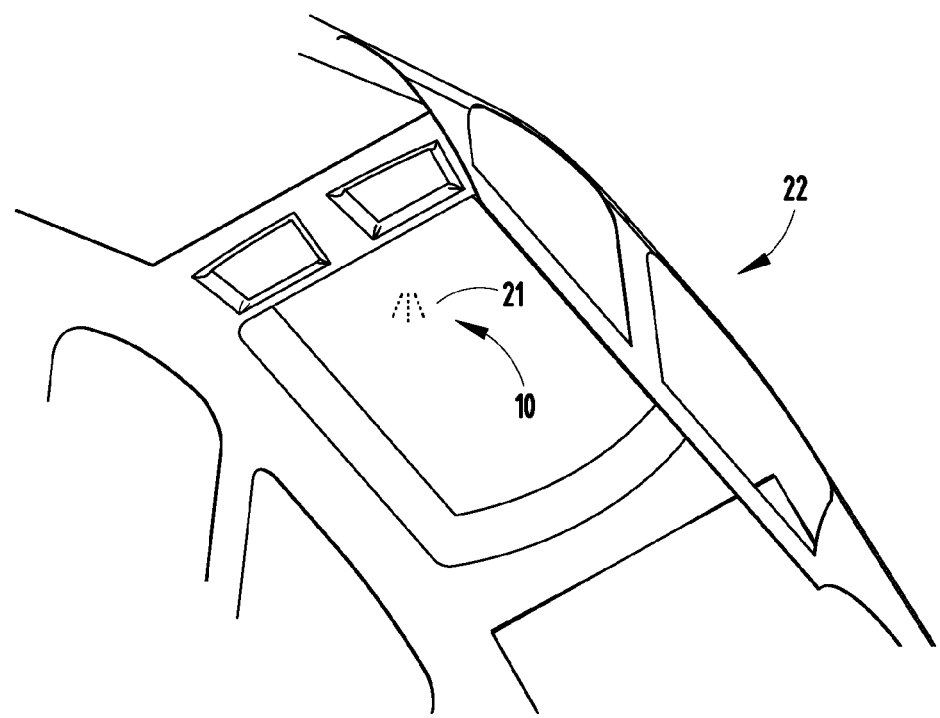
FIG. 10 is a bottom perspective view with the hidden lamp off and a proximity sensor activated.
Figure 11:
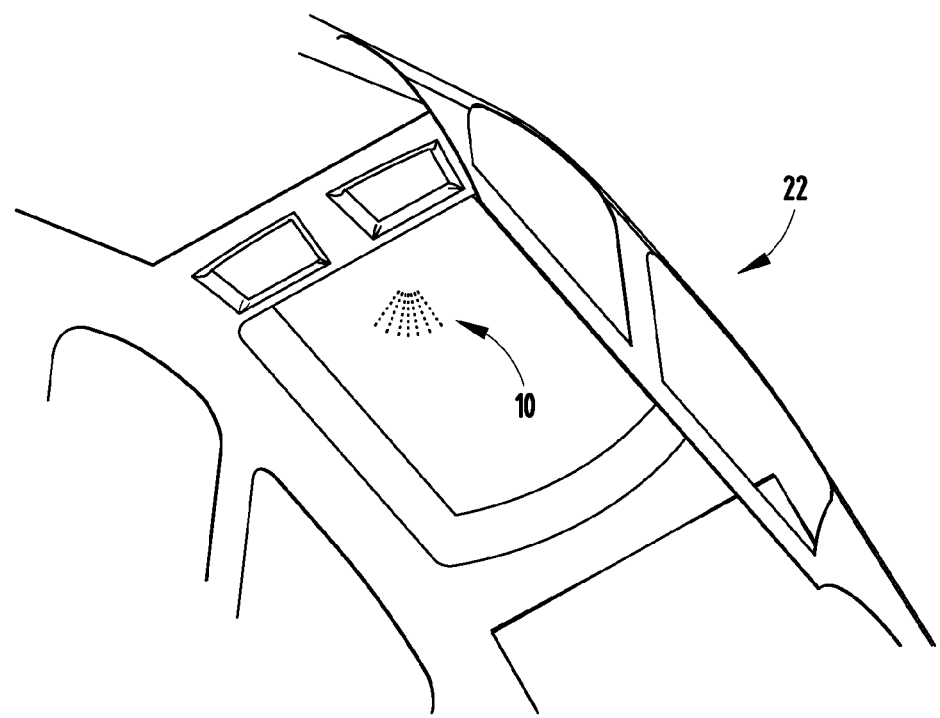

Regardless of the kind of indicator 21 used, a proximity sensor 48 is disposed proximate to the indicator 21 (FIG. 10). The proximity sensor 48 is operably connected with the circuit board 41 and may include a capacitive sensor or a heat sensor that detects objects that come within a predetermined distance of the proximity sensor 48, and consequently, the hidden lamp 20. The proximity sensor 48 is designed to sense heat or motion within a predetermined set distance from the lamp 20. When an object, such as the hand of a passenger, passes within the predetermined distance of the deactivated hidden lamp 20, the proximity sensor 48 closes a circuit switch of the hidden lamp 20, thereby activating the hidden lamp 20 (FIG. 11). Similarly, when a hand passes by the hidden lamp 20 when activated, the proximity sensor 48 opens the switch, thereby deactivating the hidden lamp 20. In one embodiment, the proximity sensor 48 senses motion or heat approximately 0-3 inches from the liner 14. This proximity distance allows the driver or passenger to activate the lamp 20, without touching or soiling the liner 14 through physical contact. The driver or passenger need only waive a hand by the proximity sensor 48 to activate the hidden lamp 20. The proximity sensor 48 is linked to the lamp 20, and after the proximity sensor 48 detects motion and/or heat, the proximity sensor 48 sends a signal to the lamp 20 to activate, as discussed above. Although the hidden lamp 20 was described above as being installed in the vehicle liner 14, it is contemplated that the hidden lamp 20 could be installed in any interior panel 10 of the vehicle 22.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for making a vehicle interior panel comprising:
    positioning a slipsheet on a liner;
    placing the liner on a substrate board;
    forming the liner and substrate board into an interior panel;
    forming a cavity by removing a portion of the substrate board from the interior panel adjacent to the slipsheet position; and
    positioning a lamp in the cavity.

2. The method of claim 1, further comprising:
    adhering the lamp onto the interior panel.

3. The method of claim 1, wherein the step of forming the liner further comprises:
    heating the liner and substrate board and molding the substrate board to form the vehicle interior panel.

4. The method of claim 1, wherein the step of positioning a slipsheet further comprises:
    positioning a mylar slipsheet on the liner.

5. The method of claim 1, further comprising:
    removing excess liner material and substrate material on an outer edge of the interior panel.

6. The method of claim 1, wherein the step of forming a cavity further comprises:
    using a water jet to cut away substrate material.

7. The method of claim 1, further comprising:
    positioning a proximity sensor adjacent to the cavity.

8. A method for making a vehicle interior panel comprising:
    forming an interior panel with a liner, a substrate, and a removable slipsheet disposed therebetween;
    removing a portion of the substrate adjacent to the slipsheet to form a cavity;
    positioning a lamp in the cavity; and
    displaying a visual indicator on an interior side of the interior panel that denotes the position of the lamp behind the liner.

9. The method of claim 8, further comprising:
    positioning a proximity sensor adjacent to the cavity.

10. The method of claim 9, wherein the step of positioning a lamp in the cavity further comprises:
    installing a light source in the cavity that emits light through the liner.

11. The method of claim 10, wherein the step of positioning a lamp in the cavity further comprises:
    installing at least one light emitting diode in the lamp.

12. The method of claim 11, wherein the step of positioning a lamp in the cavity further comprises:
    installing a light diffuser between the liner and the lamp.

13. The method of claim 8, further comprising:
    operably connecting a lens on the lamp that is visible through the liner.

14. The method of claim 8, further comprising:
    printing indicia on the liner below the lamp.

15. A method of positioning a vehicle lamp comprising:
    forming an interior panel from a liner and a substrate board;
    forming a cavity in the interior panel by removing a portion of the substrate board from the liner;
    positioning a lamp in the cavity; and
    displaying a visual indicator on an interior side of the interior panel that denotes the position of the lamp behind the liner.

16. The method of claim 15, wherein the step of positioning a lamp in the cavity further comprises:
    installing a light source in the cavity that emits light through the liner.

17. The method of claim 16, wherein the step of installing a light source further comprises:
    installing a light emitting diode in the cavity that emits light visible on the interior side of the interior panel.

18. The method of claim 15, further comprising:
    operably connecting a lens on the lamp that is visible through the liner.

19. The method of claim 15, further comprising:
    printing indicia on the liner below the lamp.

20. The method of claim 15, wherein the step of forming an interior panel from a liner and a substrate board further comprises:
    forming the liner to include a first textured material adjacent to the substrate board and a second textured material adjacent to the cavity.

* * * * *